(No Model.)
E. REYNOLDS.
CUT-OFF VALVE GEAR.
No. 293,356. Patented Feb. 12, 1884.
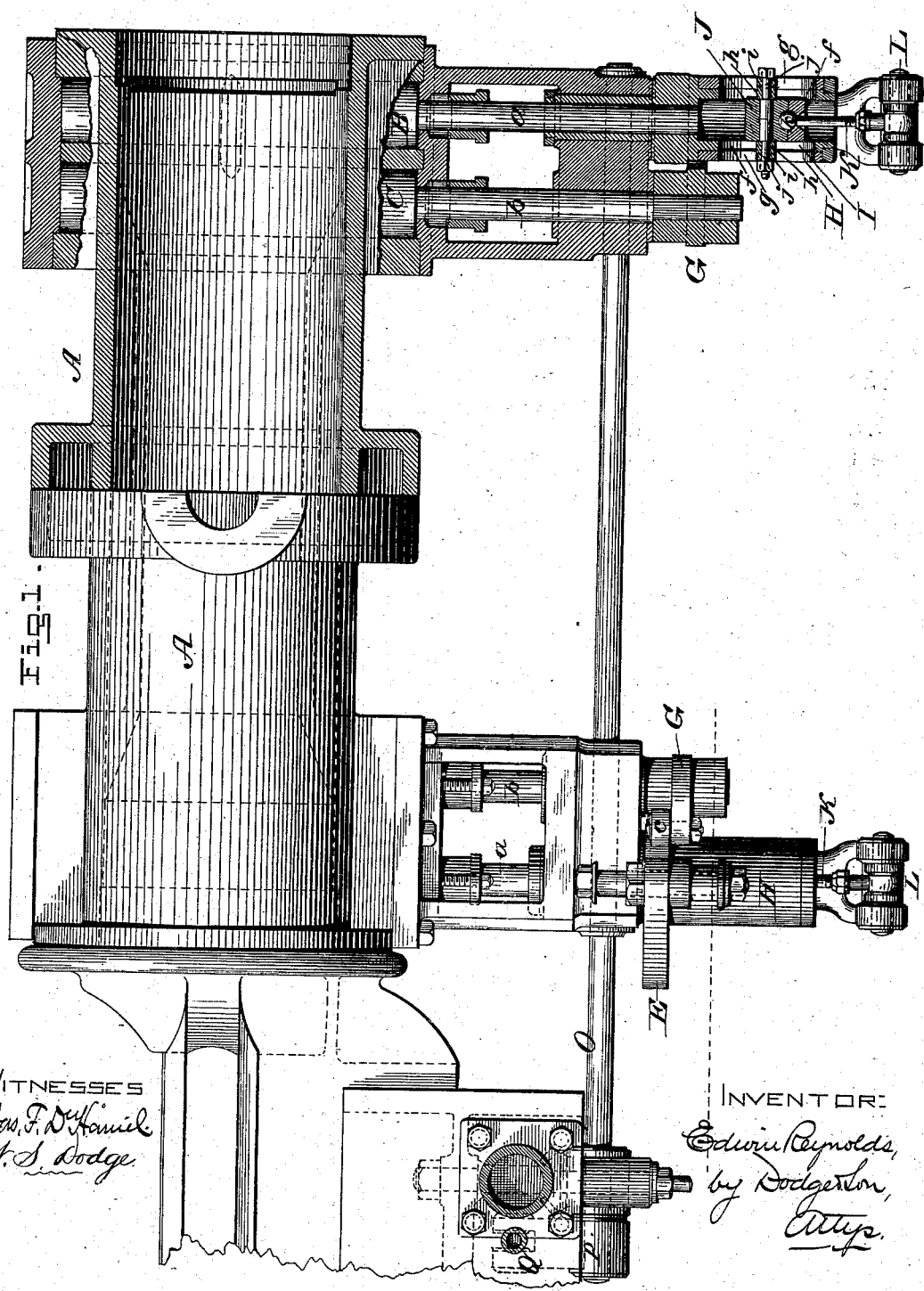

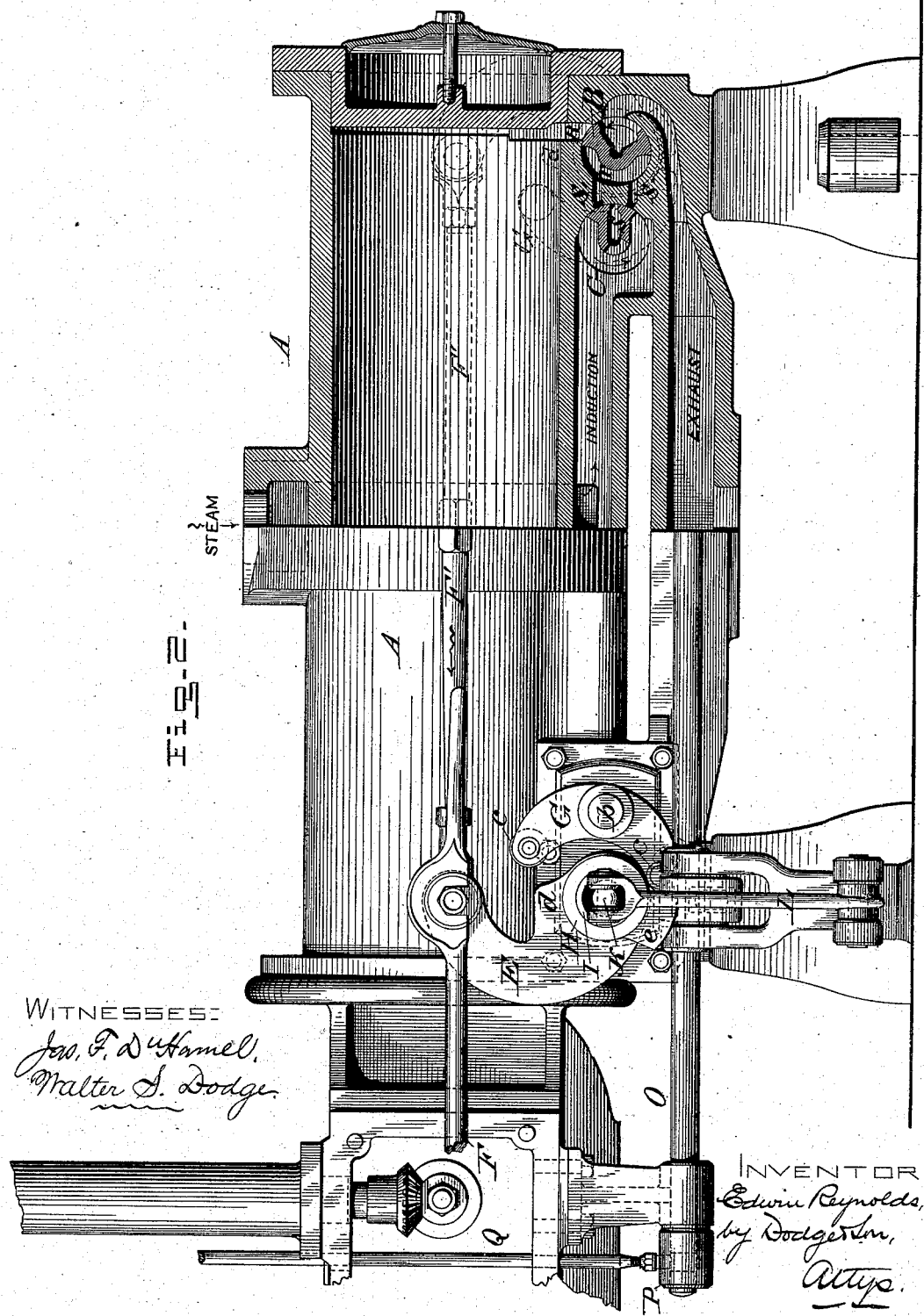

(No Model.)
E. REYNOLDS.
CUT-OFF VALVE GEAR.
No. 293,356. Patented Feb. 12, 1884.
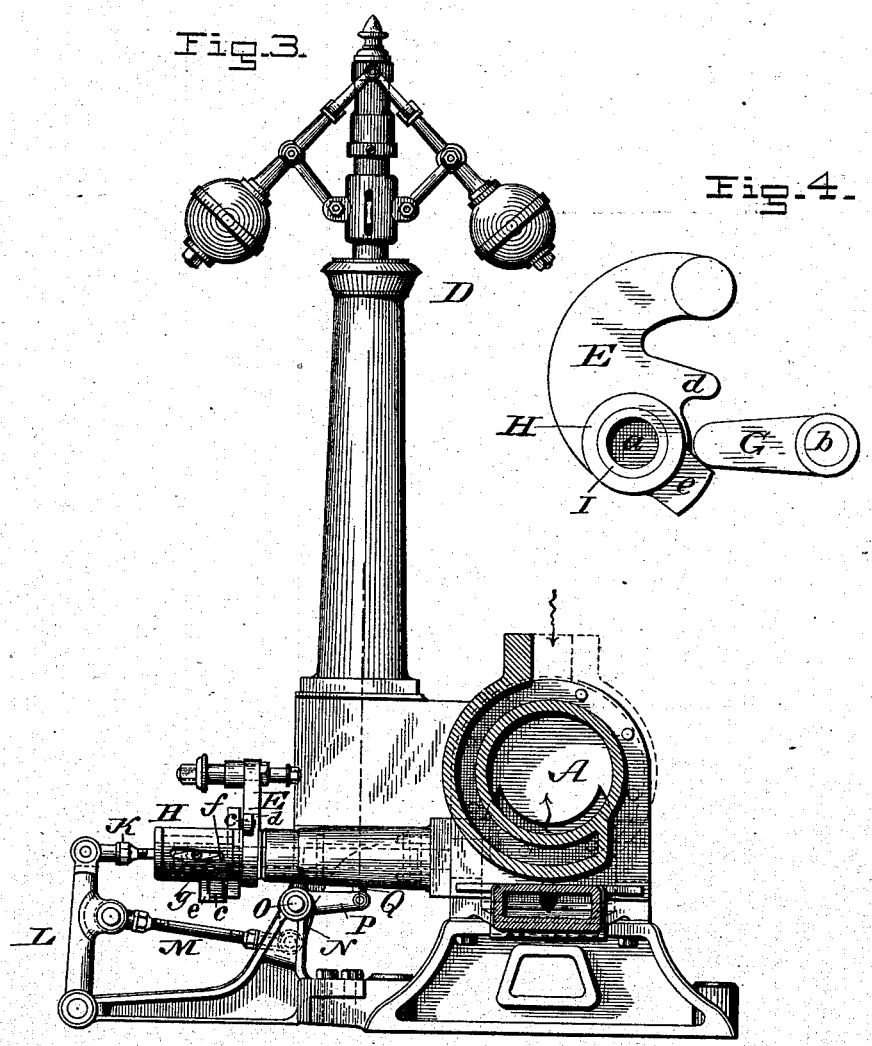
WITNESSES
Jas. F. DuHamell
Walter S. Dodge
INVENTOR:
Edwin Reynolds,
by Dodge&Son,
Attys.

UNITED STATES PATENT OFFICE.

EDWIN REYNOLDS, OF MILWAUKEE, WISCONSIN.

CUT-OFF-VALVE GEAR.

SPECIFICATION forming part of Letters Patent No. 293,356, dated February 12, 1884.

Application filed October 12, 1883. (No model.)

*To all whom it may concern:*

Be it known that I, EDWIN REYNOLDS, of Milwaukee, in the county of Milwaukee and State of Wisconsin, have invented certain Improvements in Automatic Cut-Off-Valve Gear for Steam-Engines, of which the following is a specification.

My invention relates to that class of engines in which an automatic cut-off controls the supply of steam to the cylinder in such manner as to keep the engine running at uniform speed, whether performing much or little work. Rotary valves are employed, preferably; and the invention consists, mainly, in providing the stems of the cut-off valves each with a double-ended rocking lever moved alternately in reverse directions by cams or bearing-faces of a curved arm moved by the eccentric-rod, one of said cams or faces being formed upon a sleeve, the position of which is controlled by the governor or regulator, in a manner presently explained.

In the drawings hereto annexed, Figure 1 represents a top plan view, one-half in section; Fig. 2, a side elevation, also half in section; Fig. 3, an end view showing the cylinder in transverse section; Fig. 4, a modification.

The object of my invention is to proportion the supply of steam delivered into the cylinder to the work to be performed, cutting off the steam at an intermediate point in the stroke and working it expansively when the work is light, and supplying steam at pipe-pressure throughout the stroke when the work is heavy, and to accomplish this result by automatic mechanism. With this end in view I construct the valve mechanism and valves in the following manner:

A indicates the steam-cylinder, in which moves the ordinary piston; B, the valve by which steam is admitted to or exhausted from the cylinder at one end, it being of course understood that the same arrangement of parts is used at both ends of the cylinder; C, the cut-off valve, and D the governor by which the action of the cut-off valve is controlled.

The valve B is rocked by an arm, E, secured rigidly upon its stem $a$, motion being given to the arm by the eccentric-rod F, alternately in opposite directions, to close the induction-passage and open the exhaust, or to close the exhaust and open the induction ports.

The valve C, which cuts off the steam independently of valve D, has its stem $b$ provided with a double-armed lever, G, the extremities of which are advisably furnished with anti-friction rollers $c$, which are alternately struck by cams or bearing-faces $d$ and $e$, the former of which is upon the arm E, which rocks the valve B. The cam or bearing-face $e$ is formed upon a sleeve, H, which encircles a tubular neck or sleeve, I, made fast upon the end of stem $a$ of valve B, the outer sleeve being loose and free to turn upon the inner one when acted upon by the governor through suitable intermediate parts.

The throw or movement of arm E is of course uniform under all circumstances, because said arm is directly actuated by the eccentric-rod F; hence it follows that the steam will be cut off earlier or later in the stroke, just as the cam or ear $e$ is thrown more or less forward or inward toward the rocking lever G.

The sleeves H and I are both provided with inclined slots, the slots $f$ of sleeve H running in the reverse direction from the slots $g$ of sleeve I, as shown in Fig. 3.

J indicates a sliding block fitting the interior of the sleeve or tubular neck H, and provided with two radial arms, $j$, each carrying two anti-friction rollers, $h$ and $i$, the rollers $h$ being arranged within the slots $f$ of sleeve H, and the rollers $i$ within the slots $g$ of sleeve I. It will be apparent that if the block J be moved longitudinally within the tubular neck I, which is held against rotation, except as moved by arm E, the sleeve H will be turned or rotated a distance equal to the sum of the angles of the two sets of slots by the length of movement. In this way the ear or bearing-face $e$ of sleeve H will be moved toward or from the rocking lever G just in proportion to the inward or outward movement of sliding block J. This block J is connected by a link, K, with an upright swinging yoke, L, pivoted at its lower end, and connected by a pitman, M, with a crank-arm, N, secured rigidly upon a shaft, O, which has also secured upon it a crank-arm, P, which is jointed to or connected with the vertical rod or spindle Q of the governor or regulator D, so that as the governor-balls rise—as they will of course do when, from decrease of load or increase of pressure, the engine begins to run a little fast— the block J will be forced inward, causing the ear or cam e to strike the lever G early in the stroke and to cut off the steam when but little has entered the cylinder, or as the governor-balls fall the block will be drawn outward, the ear or cam e thrown back, and the steam cut off only at or near the end of the stroke.

In view of the fact that the sleeves H I are constantly rocking back and forth, it is necessary to employ a ball-and-socket or other form of universal joint, k, to connect the link K and sliding block J. So long as the governor-balls continue in a given horizontal plane the block J will be at rest, except as to rocking with the arm E, which operates the valve B, the radial arms j merely serving at such time to connect the outer sleeve, H, and inner sleeve or hub, I, thereby causing the latter and its ear or cam e to move with lever E and its cam or bearing-face d.

The cut-off valve is a double-ported valve, as shown in Fig. 2, and, as above stated, its stem is furnished with the double-ended lever G.

The action of the mechanism is as follows: The valves being in the position shown in Fig. 2, motion of the eccentric-rod F in the direction of the arrow, or toward the left hand, will cause the lever E, and consequently the valve-stem a and valve B, to partly revolve in the direction of the arrow until it reaches the extremity of its throw, when the port R will be opened to the exhaust. At the same time the cam d engages with the upper end of the double-ended lever G and causes said lever, valve-stem b, and valve C to partly revolve in the direction of the circular arrow, and the ports S are opened, but no steam can pass through the passages T, as the valve B covers the outlets. During this part of the motion the hub I of the lever E has, by means of the block J and connections, carried the sleeve H with it. The block J is prevented from longitudinal movement by the resistance opposed by the regulator, thus causing the cam e to be moved out of the way of the advancing lower end of lever G. The motion of eccentric-rod F being now reversed, the lever E, valve-stem a, and valve B are revolved in the opposite direction, or toward the right hand, until when the piston has reached the right-hand end of the cylinder A the valve B begins to uncover the port R, admitting steam through the passages S, T, and R to the interior of the cylinder A. Steam being now admitted to the cylinder A, and the eccentric-rod F not having completed its stroke, it is required that the steam should be cut off from entering the cylinder during the remainder of the stroke. This is done in the following manner: Suppose the engine to be running with a maximum load which requires the steam to follow the piston to the full limit. The regulator-balls will then be at their lowest position, and the rod Q, being depressed, will, through crank-arms P N, shaft O, connecting-rod M, yoke L, and link K, cause the block J to have a longitudinal movement in the hub I of lever E away from cylinder A, and so, by means of the arms j and connections h i, to partially revolve the sleeve H in a direction contrary to that in which the hub I is revolving, thus keeping the cam or ear e from coming into contact with the lower end of lever G (and so closing the valve C) until it should properly do so by the motion of lever E, independently of the regulator, the cut-off valve C remaining open during the whole stroke, when of course the valve B operates to close the port at the close of the stroke. Now, if the load be decreased, the regulator D, acquiring an increased velocity, causes the balls to rise, and consequently to raise the rod Q, and through it the levers P and N, shaft O, connecting-rod M, carrier or yoke L, link or connecting-rod K, and block J, to have a longitudinal movement in the hub I toward the cylinder A, and by means of the pin or arms j and rollers h i to partially revolve the sleeve H in the same direction that the lever E is moving, and so bring the cam or ear e nearer to the lower end of lever G and close the valve C by the further movement of lever E. By this means the steam is admitted at pipe-pressure and cut off at a point that will secure a uniform speed regardless of load carried.

While I prefer to employ the anti-friction rollers in the ends of lever G and upon the arms j of block J, they are not absolutely necessary, and may be omitted.

The arms j may be formed by a pin or rod passing through block J, and its ends may be furnished with the rollers h i, with blocks of suitable shape and material to move easily in the slots f g, or they may simply be left of cylindrical form.

It will of course be understood that the valve mechanism described is duplicated, one set of valves being placed at each end of the cylinder and the two sets adjusted to operate alternately—that is to say, while one set admit steam to the cylinder the other set permit the spent steam to exhaust therefrom. One governor, of course, regulates both sets of valves, the shaft O extending lengthwise of the cylinder and carrying two sets of arms, N P, one set for each set of valves. The arms or levers E at opposite ends of the cylinder are turned in opposite directions and connected by the rod F', which is in effect a continuation or part of the eccentric-rod F.

While I prefer to employ the double-ended lever on the cut-off valve, it will be readily seen that a single-ended lever or radial arm may be used, as shown in Fig. 4, its end being arranged between the two cams d and e, which will of course be set accordingly, to actuate the radial arm or lever of the cut-off valve, in the same manner, substantially, as where the double-ended lever is used. In such case the position of the eccentric will of course be regulated to give the proper movement to the valves.

Having thus described my invention, what I claim is—

1. In a steam-engine, the combination of a steam inlet and outlet valve, a cut-off valve, a double-ended lever for operating the cut-off valve, and a swinging arm or lever connected with the eccentric-rod, and provided with bearing-faces on opposite sides of its center of motion, to actuate the double-ended lever in opposite directions, one of said bearing-faces being adjustable relatively to the lever, substantially as explained, to vary the point at which the steam shall be cut off.

2. The combination, in a steam-engine, of a steam cylinder and piston, an inlet and outlet valve, B, provided with arm or lever E, having bearing-face or cam $d$, cam or ear $e$, adjustable in relation to cam $d$, substantially as set forth, cut-off valve C, and double-ended lever G, connected with the cut-off valve, substantially as and for the purpose explained.

3. In a steam-engine, the combination of a steam-cylinder, and at each end of said cylinder an inlet and outlet valve, B, provided with lever E, cam or bearing-face $d$, and adjustable cam $e$, cut-off valve C, provided with double-ended lever G, and a rod, F', connecting the two levers E at opposite ends of the cylinder, a rod, F, connected with the eccentric of the engine, and a regulator connected with the adjustable cam $e$, substantially as set forth, whereby said cam is automatically set to cut off the steam at any required point.

4. In a steam-engine, the combination of a cut-off valve, C, provided with a double-ended lever, G, an induction and eduction valve, B, provided with an operating-lever, E, having a rigid cam or bearing-face, $d$, and a movable cam or bearing-face, $e$, connected with said lever, and with a regulator or governor, D, substantially as explained, whereby the governor is caused to control the position of the adjustable cam or bearing-face.

5. In combination with cut-off valve C, having double-ended lever G, valve B, provided with lever E, having rigid cam or face $d$, stem $a$, and hub or sleeve I, provided with slots $g$, sleeve H, encircling hub I, and provided with slots $f$, sliding block J, having arms $j$, extended through slots $f\,g$, governor D, and intermediate connections, substantially as described and shown, between the block J and governor.

6. In combination with cylinder A, cut-off valve C, having double-ended lever G, valve B, provided with lever E, having face $d$, stem $a$, and hub I, provided with slots $g$, sleeve H, encircling hub I, and provided with slots $f$, and sliding block J, provided with arms $j$, said arms being extended through the slots $f\,g$, and serving to rotate sleeve H about sleeve or hub I when moved longitudinally of the hub, substantially as explained.

7. In combination with valves B C, constructed and arranged to operate as described, sleeve H, provided with ear or cam $e$ and slots $f$, hub I within said sleeve, and provided with slots $g$, sliding block J, link K, connected with block J by a universal joint, yoke L, connecting-rod M, shaft O, crank-arms N P, governor D, and rod Q, all combined and operating substantially as set forth.

8. In combination with valves B C, and with a rotary sleeve adapted to control the movements of cut-off valve C, substantially as explained, a sliding block, J, adapted to rotate said sleeve, and connected with the rod Q of a governor, D, through the medium of link K, yoke L, rod M, shaft O, and arms N P, as shown and described.

9. In a steam-engine, the combination of a steam inlet and outlet valve, a cut-off valve provided with an arm or lever, and a moving arm or body, substantially as shown, provided with two bearing-faces or cams to act alternately upon the arm of the cut-off valve, one of said bearings being adjustable relatively to said moving body to vary the point at which the steam is cut off.

10. In a steam-engine, the combination of a steam inlet and outlet valve, a cut-off valve provided with an arm or lever, a moving block or lever, substantially as shown, provided with two bearing-faces to act alternately upon the arm of the cut-off valve, one of said bearing-faces being adjustable relatively to the other, a governor, and intermediate devices connecting the governor and the movable bearing-face, substantially as and for the purpose set forth.

11. In a steam-engine, the combination, substantially as shown, of a steam cylinder and piston, an inlet and outlet valve, B, provided with arm or lever E, having bearing-face or cam $d$, cam or ear $e$, adjustable in relation to cam $d$, substantially as set forth, and cut-off valve C, provided with an arm or lever, substantially as and for the purpose explained.

EDWIN REYNOLDS.

Witnesses:
CHARLES ALLIS,
ALBERT HOPPIN.